(12) United States Patent
Chen et al.

(10) Patent No.: US 8,494,218 B2
(45) Date of Patent: Jul. 23, 2013

(54) LIGHT INFORMATION RECEIVING METHOD, UNIT AND METHOD FOR RECOGNITION OF LIGHT-EMITTING OBJECTS

(75) Inventors: Yi-Yuan Chen, Yangmei Town (TW); Kung-Ming Lan, Jiaoxi Township, Yilan County (TW); Hung-I Pai, Shulin (TW); Jen-Hui Chuang, Hsinchu (TW); Chii-Yah Yuan, Hsinchu (TW)

(73) Assignee: Industrial Technology Research Institute, Hsinchu (TW)

( * ) Notice: Subject to any disclaimer, the term of this patent is extended or adjusted under 35 U.S.C. 154(b) by 776 days.

(21) Appl. No.: 12/703,352

(22) Filed: Feb. 10, 2010

(65) Prior Publication Data

US 2011/0044500 A1 Feb. 24, 2011

(30) Foreign Application Priority Data

Aug. 18, 2009 (TW) ................................ 98127761 A

(51) Int. Cl.
*G06K 9/00* (2006.01)
*H04N 7/00* (2011.01)

(52) U.S. Cl.
USPC ............ 382/103; 382/106; 382/260; 348/113

(58) Field of Classification Search
None
See application file for complete search history.

(56) References Cited

U.S. PATENT DOCUMENTS

| | | | | |
|---|---|---|---|---|
| 5,168,528 A * | 12/1992 | Field, Jr. | | 382/103 |
| 6,515,740 B2 * | 2/2003 | Bamji et al. | | 356/141.1 |
| 6,580,496 B2 * | 6/2003 | Bamji et al. | | 356/5.1 |
| 6,970,148 B2 * | 11/2005 | Itoh et al. | | 345/63 |
| 7,164,810 B2 * | 1/2007 | Schnee et al. | | 382/313 |
| 7,412,076 B2 * | 8/2008 | Yoshimura et al. | | 382/103 |
| 7,415,212 B2 * | 8/2008 | Matsushita et al. | | 398/140 |
| 7,447,331 B2 * | 11/2008 | Brown et al. | | 382/103 |
| 7,505,607 B2 * | 3/2009 | Meunier et al. | | 382/103 |
| 7,633,041 B2 * | 12/2009 | Furman et al. | | 250/201.2 |
| 2001/0015156 A1 | 8/2001 | Branam et al. | | |
| 2004/0146203 A1 * | 7/2004 | Yoshimura et al. | | 382/218 |
| 2006/0255246 A1 | 11/2006 | Hetherington | | |
| 2007/0263090 A1 * | 11/2007 | Abe | | 348/148 |

(Continued)

FOREIGN PATENT DOCUMENTS

CN 1334949 2/2002
TW I298799 7/2008

(Continued)

OTHER PUBLICATIONS

English language translation of abstract of TW I302879.

(Continued)

*Primary Examiner* — Manav Seth
(74) *Attorney, Agent, or Firm* — McClure, Qualey & Rodack, LLP

(57) ABSTRACT

A light information receiving method, a method and a unit for the recognition of light-emitting objects are provided. The light information receiving method includes the following steps. A light-emitting object array is captured to obtain a plurality of images, wherein the light-emitting object array includes at least one light-emitting object. A temporal filtering process is performed to the images to recognize a light-emitting object. A light-emitting status of the light-emitting object array is recognized according to the light-emitting object location. A decoding process is performed according to the light-emitting status to output an item of information.

20 Claims, 17 Drawing Sheets

U.S. PATENT DOCUMENTS

2007/0263901 A1 11/2007 Wu et al.
2008/0212833 A1* 9/2008 Page .............................. 382/103
2009/0033757 A1* 2/2009 Shimada .................... 348/222.1

FOREIGN PATENT DOCUMENTS

| TW | I302879 | 11/2008 |
|---|---|---|
| TW | I315396 | 10/2009 |
| WO | WO 99/49435 | 9/1999 |
| WO | WO 03/088136 | 10/2003 |

OTHER PUBLICATIONS

English language translation of abstract of CN 1334949 (published Feb. 6, 2002).

English language translation of abstract of TW I298799.

Lu, K.H., et al.; "Traffic Light Recognition;" Journal of the Chinese Institute of Engineers; vol. 31, No. 6, 2008, pp. 1069-1075.

Lu, X., et al.; "Basic Study on Indoor Location Estimation using Visible Light Communication Platform;" International IEEE EMBS Conference; Aug. 2008; pp. 2377-2380.

Iwasaki, I., et al.; "Basic Experiments on Paralle Wireless Optical Communication for ITS;" IEEE Intelligent Vehicles Symposium; Jun. 2007; pp. 321-326.

Iwasaki, I., et al.; "Visible Light Road-to-Vehicle Communication Using High-Speed Camera;" Intelligent Vehicles Symposium; Jun. 2008; pp. 13-18.

Komine, T., et al.; "Fundamental Analysis for Visible-Light Communication System using LED Lights;" IEEE Transactions on Consumer Electronics, vol. 50, No. 1; Feb. 2004; pp. 100-107.

Pang, G.K.H., et al.; LED Location Beacon System Based on Processing of Digital Images; IEEE Transactions on Intelligent Transportation Systems, vol. 2, No. 3; Sep. 2001; pp. 135-150.0.

Pang, G., et al.; "Visible Light Communication for Audio Systems;" IEEE Transactions on Consumer Electronics, vol. 45, No. 4; Nov. 1999; pp. 1112-1118.

Chen, Y.Y., et al.; "Robust Light Objects Recognition Based on Computer Vision;" International Symposium on Pervasive Systems, Algorithms, and Networks; 2009; pp. 508-514.

O'Brien, D.C., et al.; "Visible Light Communications: Challenges and Possibilities;" IEEE; 2208; pp. 1-5.

Liu, H.S., et al.; "Positioning Beacon System Using Digital Camera and LEDs;" IEEE Transactions on Vehicular Technology, vol. 52, No. 2; Mar. 2003; pp. 406-419.

English language translation of abstract of TW I315396.

\* cited by examiner

LIGHT INFORMATION RECEIVING METHOD, UNIT AND METHOD FOR RECOGNITION OF LIGHT-EMITTING OBJECTS

This application claims the benefit of Taiwan application Serial No. 98127761, filed Aug. 18, 2009, the subject matter of which is incorporated herein by reference.

BACKGROUND OF THE DISCLOSURE

1. Field of the Disclosure

The disclosure relates in general to a light information receiving method, a method and a unit for the recognition of light-emitting objects.

2. Description of the Related Art

A real-time vehicle detection and recognition system for nighttime traffic surveillance is disclosed in Taiwan Patent Application Serial No I302879. Through the light source image cutting device, light source object cutting process is performed to the captured image of the light source object. The night-time vehicle light source object recognition device uses a morpho-analysis unit to obtain the characteristics of each vehicle from the categorized light source object group. The vehicle location determination device uses a distance estimation unit to obtain the location information of the vehicles ahead and itself. After obtaining the location of the targeted light source object group, the vehicle tracking device detects the moving direction of the vehicles with respect to the continuous frames according to the location information so as to determine the information of movement of the vehicles entering the surveillance frame area.

SUMMARY OF THE DISCLOSURE

The disclosure is directed to a light information receiving method, a method and a unit for the recognition of light-emitting objects.

According to a first aspect of the present disclosure, a light information receiving method is provided. The light information receiving method includes the following steps. A light-emitting object array is captured to obtain several images, wherein the light-emitting object array includes at least one light-emitting object. A temporal filtering process is performed to the images to recognize the light-emitting object location. A light-emitting status of the light-emitting object array is recognized according to the light-emitting object location. A decoding process is performed to output an item of information according to the light-emitting status.

According to a second aspect of the present disclosure, a light-emitting object location recognizing method is provided. The method of light-emitting object location recognizing includes the following steps. The image differencing process is performed to several images to output several differential images according to the images which are obtained by capturing a light-emitting object array having at least one light-emitting object. A logic operation is performed to output a foreground image according to the differential images. A light-emitting object location is recognized according to the foreground image.

According to a third aspect of the present disclosure, a light-emitting object location recognizing unit is provided. The light-emitting object location recognizing unit includes a storage unit, an image differencing unit, a logic unit and a location outputting unit. The image differencing unit performs image differencing according to the $(i-n)^{th}$ to the $i^{th}$ images to output several differential images. The $(i-n)^{th}$ to the $i^{th}$ images are obtained by capturing the light-emitting object array, wherein the light-emitting object array includes at least one light-emitting object. The logic unit performs logic operation according to the differential image to output the foreground image. The location outputting unit recognizes the light-emitting object location according to the foreground image. The storage unit stores a part of the images.

The disclosure will become apparent from the following detailed description of the preferred but non-limiting embodiments. The following description is made with reference to the accompanying drawings.

DETAILED DESCRIPTION OF THE DISCLOSURE

Figure 1:
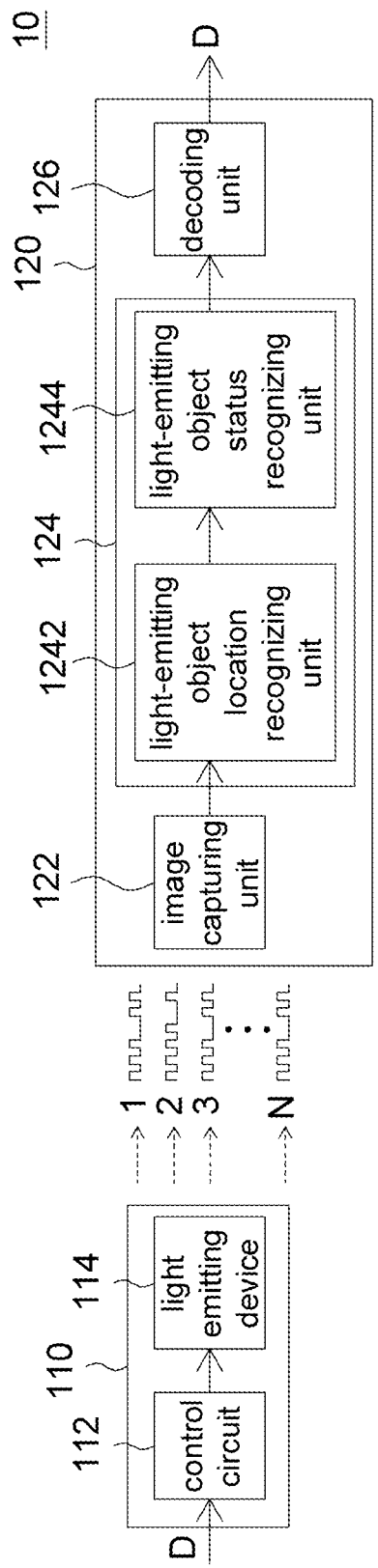
FIG. 1 shows a light information transmission system.
Figure 2:
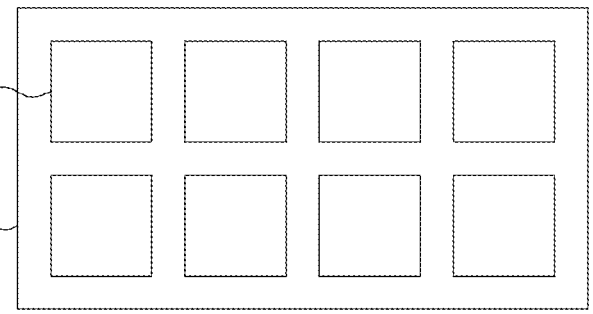
FIG. 2 shows a light emitting device.
Figure 3:
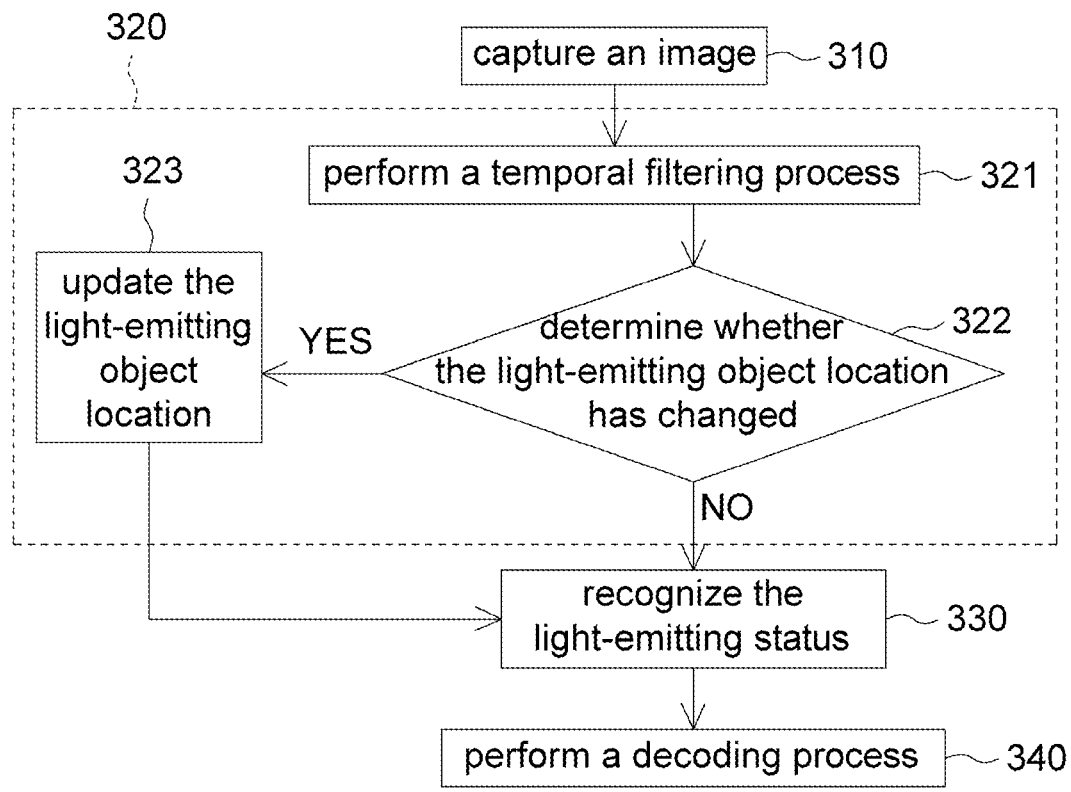
FIG. 3 shows a flowchart of a light information receiving method.

Light Information Transmission System:

Referring to FIG. 1, FIG. 2 and FIG. 3. FIG. 1 shows a light information transmission system. FIG. 2 shows a light emitting device. FIG. 3 shows a flowchart of a light information receiving method. The light information transmission system 10 includes a light emitting device 110 and a light receiving device 120. The light emitting device 110 further includes a control circuit 112 and a light emitting device 114. The light receiving device 120 further includes an image capturing unit 122, a recognizing unit 124 and a decoding unit 126. The recognizing unit 124 further includes a light-emitting object location recognizing unit 1242 and a light-emitting object status recognizing unit 1244.

The light emitting device 114 is a light-emitting object array having at least one light-emitting object for example.

That is, the light-emitting object array may include one single light-emitting object or several light-emitting objects. The light-emitting object being in bright status denotes "1" signal. To the contrary, the light-emitting object being in dark status denotes "0" signal. Besides, the transmitted signal translated by the light emitting device 114 can be the patterns with different combinations of arrangements. The long and the short signals of the time axis denote texts with meaning. The light emitting device 114 of FIG. 1 is exemplified as a 4×2 light-emitting object 1142 in FIG. 2, and the pattern of the light-emitting object 1142 has $2^8$ combinations. The control circuit 112 controls the light emitting device 114 according to an information D, so that the information D can be transmitted with light through the light emitting device 114.

The light information receiving method, adapted to the light receiving device 120, includes an image capturing step 310, a light-emitting object location recognizing step 320, a light-emitting object status recognizing step 330 and a decoding step 340. Firstly, in the image capturing step 310, the image capturing unit 122 captures the image of the light-emitting object 1142 of the light emitting device 114, wherein the image capturing unit 122 is a video recorder or a camera for example.

Next, the method proceeds to the light-emitting object location recognizing step 320, the light-emitting object location recognizing unit 1242 recognizes the locations of all light-emitting objects in the image. In the light-emitting object location recognizing step, the light-emitting object location is recognized with the information of known transmission protocol, such as the start and the end pattern of each item of information, the geometric relation of the light-emitting object and the transmission frequency. Then, the method proceeds to the light-emitting object status recognizing step 330, the light-emitting object status recognizing unit 1244 recognizes the light-emitting status of the light-emitting object 1142 according to the light-emitting object location.

On the part of image recognition, under a complicated background environment, it is very difficult to extract the light-emitting object and recognize its status of brightness or darkness from each image by image processing technology. This is because the employed technology is not other than the foreground and background extraction technique. However, a background image suitable for image processing cannot be found, so some advanced image processing technologies such as image morphology and topology are employed. Furthermore, color image processing technology may be employed. Under such circumstance, the computer processing speed will be slowed down.

Therefore, the light receiving device 120 recognizes the light-emitting object location by the light-emitting object location recognizing unit 1242. Then, partial image with light-emitting object pattern is recognized for the recognition of the light-emitting object status with respect to the light-emitting object location through the light-emitting object status recognizing unit 1244. The light-emitting object status recognizing unit 1244 only needs to recognize partial image having light-emitting object pattern instead of recognizing the whole image, so the status of the light-emitting object can be easily and promptly recognized without employing complicated image processing technology.

After the light-emitting object status is recognized, the method proceeds to the decoding step 340, the decoding unit 126 performs a decoding process to output an item of information D according to the light-emitting status of the light emitting device 114. Thus, the information D of the light emitting device 110 is transmitted to the light receiving device 120 in the form of light signal so as to achieve the transmission of information.

Figure 4:
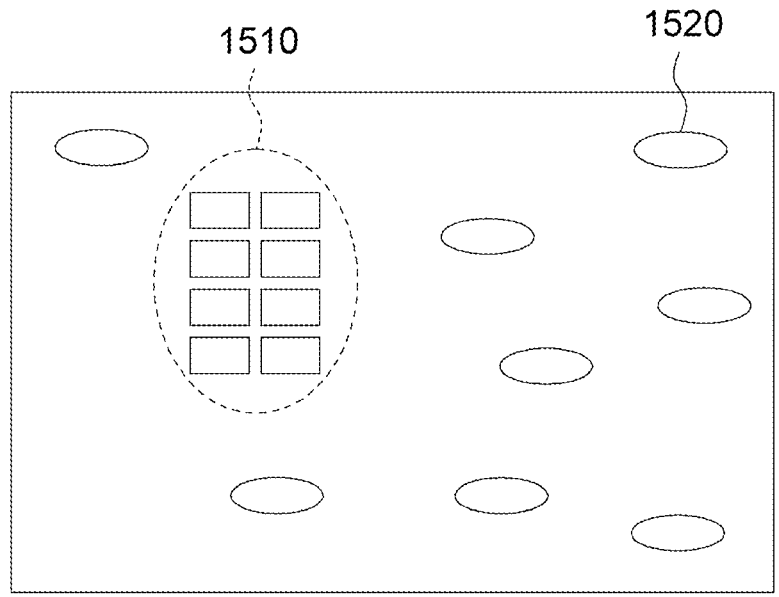
FIG. 4 shows a foreground image under background interference.

Referring to FIG. 3 and FIG. 4. FIG. 4 shows a foreground image under surrounding interference. The light-emitting object location recognizing step 320 disclosed above is itself a light-emitting object location recognizing method. The light-emitting object location recognizing step 320 further includes sub-steps 321 to 323. Firstly, as indicated in step 321, a temporal filtering process is performed to several images obtained by capturing the light-emitting object array to recognize the location of the light-emitting object 1142 in the image. The process of information transmission is easily interfered with by background environment, so the light-emitting object cannot be recognized properly. For example, in FIG. 4, the foreground image includes the pattern 1510 of the real light-emitting object as well as other foreground objects 1520 such as other moving objects and light emitting sources. To avoid being interfered with by the background environment, the light-emitting object location recognizing unit 1242 performs a temporal filtering process to recognize the real light-emitting object location with a temporal filter.

Next, as indicated in step 322, whether the light-emitting object location in the current image has changed is determined. If the light-emitting object location in the current image does not change, then the method proceeds to the light-emitting object status recognizing step 330. The light-emitting object status recognizing unit 1244 recognizes the light-emitting status of the light-emitting object 1142 of the current image according to the light-emitting object location. As the light-emitting object location in the current image does not change, the light-emitting object status recognizing unit 1244 is able to recognize the light-emitting object status in the current image according to the previous location of the light-emitting object. To the contrary, if the light-emitting object location in the current image has already changed, then the light-emitting object location needs to be updated first as indicated in step 323, then the method proceeds to the light-emitting object status recognizing step 330. As the light-emitting object location in the current image has already changed, the light-emitting object status recognizing unit 1244 recognizes the light-emitting object status in the current image according to the updated light-emitting object location.

Figure 5:
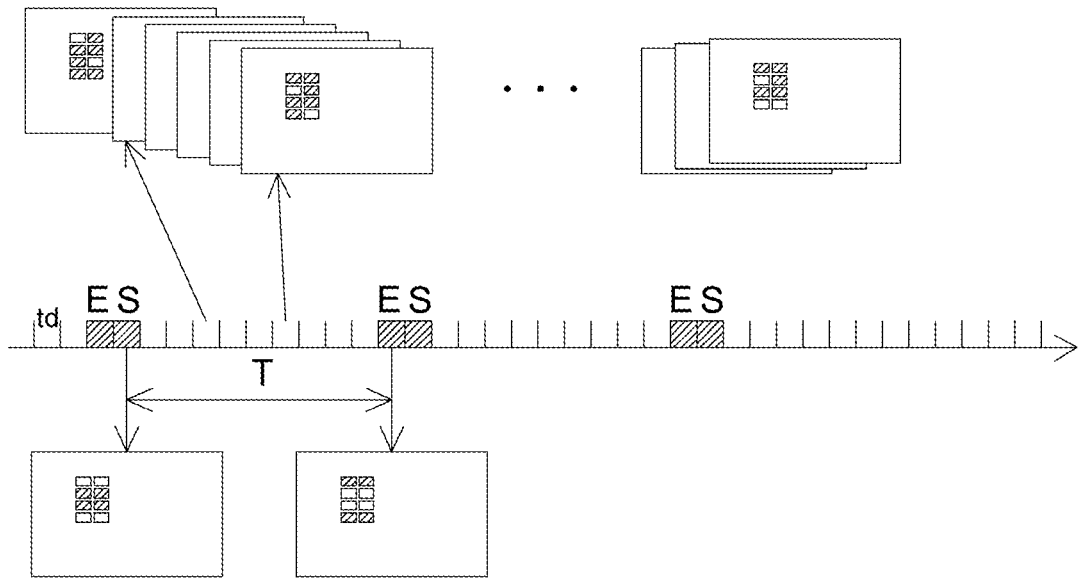
FIG. 5 shows spatial domain information transmission.

Spatial Domain Information Transmission:

Referring to FIG. 2 and FIG. 5. FIG. 5 shows spatial domain information transmission. The transmission of information can be spatial domain information transmission or time domain information transmission. According to the spatial domain information transmission, information is transmitted by the light-emitting object through the combined bright/dark patterns. In FIG. 5, the process of information transmission includes a start pattern S and an end pattern E to distinguish each item of transmitted information, wherein T denotes the transmission time of each information, td denotes the maintaining time of each pattern, and fd=1/td represents pattern transmission frequency. Thus, the image capturing frequency fc of the image capturing unit 122 of FIG. 1 is at least greater than fd so as to avoid losing information image.

Figure 6:
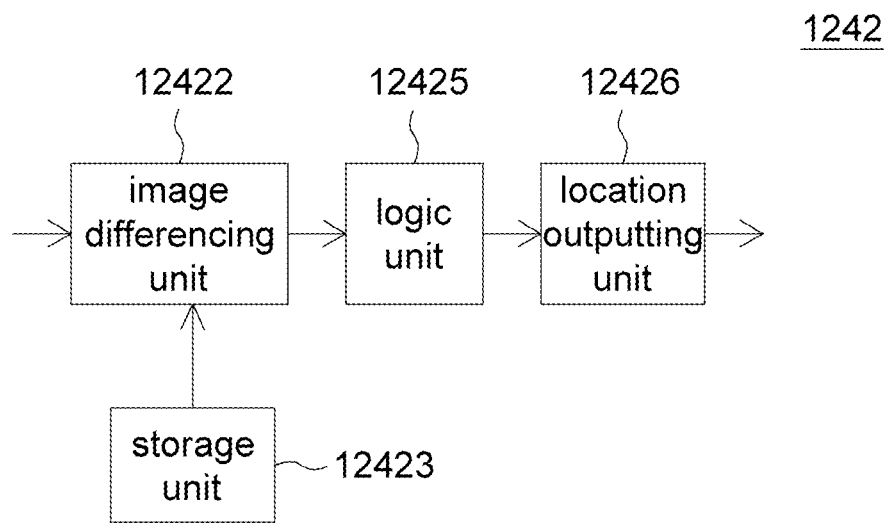
FIG. 6 shows a light-emitting object location recognizing unit.
Figure 7:
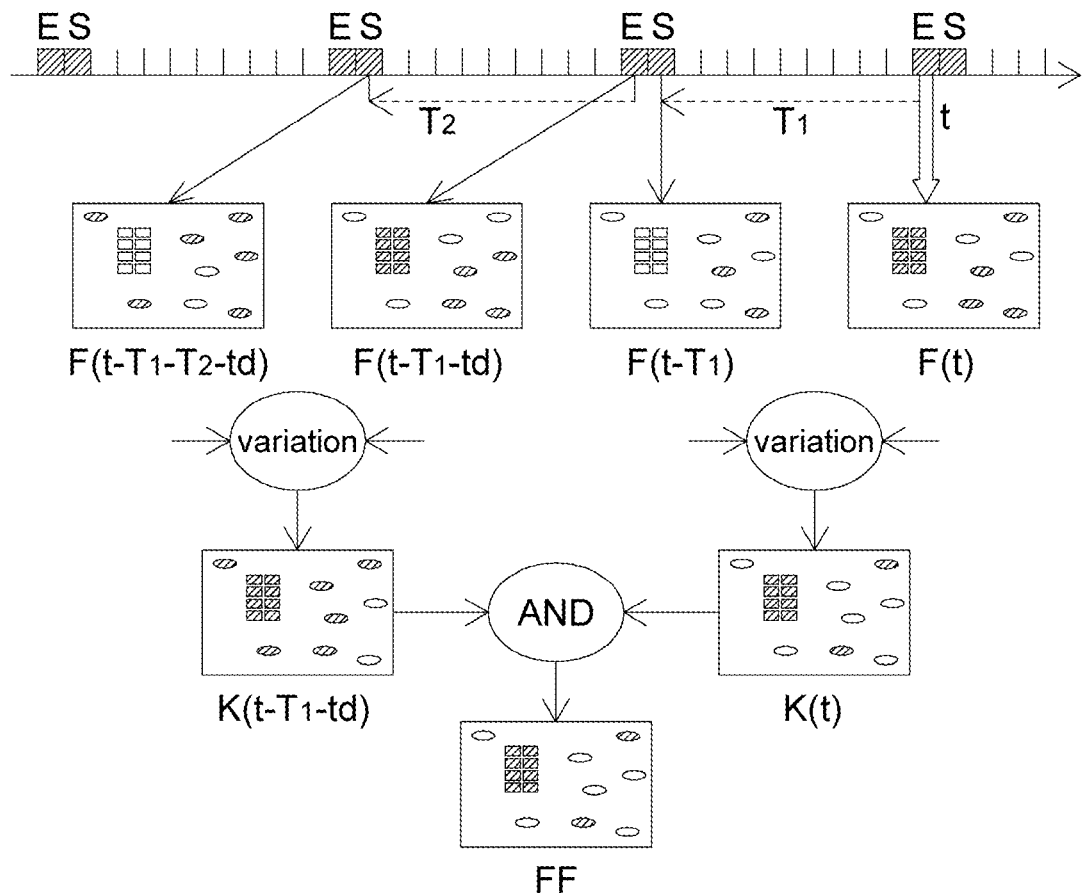
FIG. 7 shows a timing diagram of the temporal filter for spatial domain information transmission.
Figure 8:
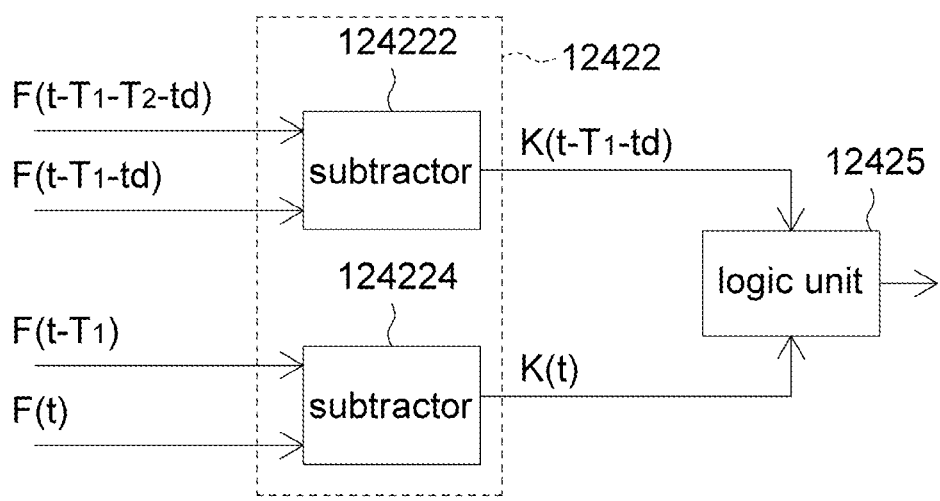
FIG. 8 shows an image differencing unit and a logic unit.
Figure 9:
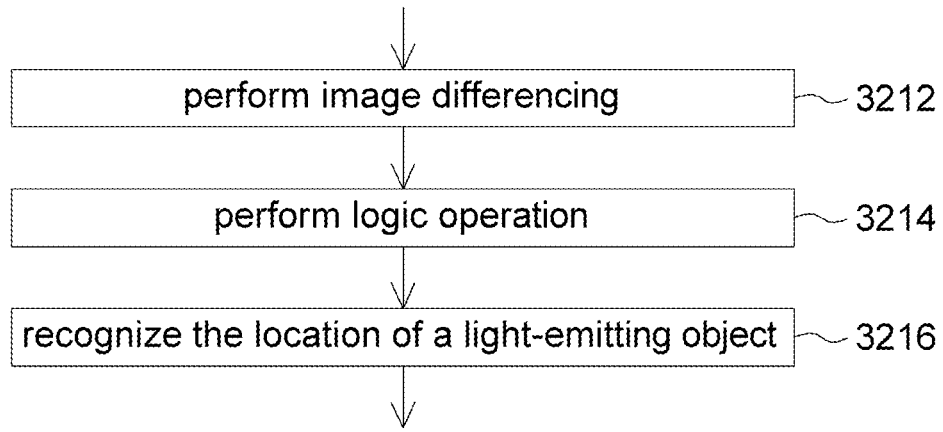
FIG. 9 shows a flowchart of step 321.
Figure 10:
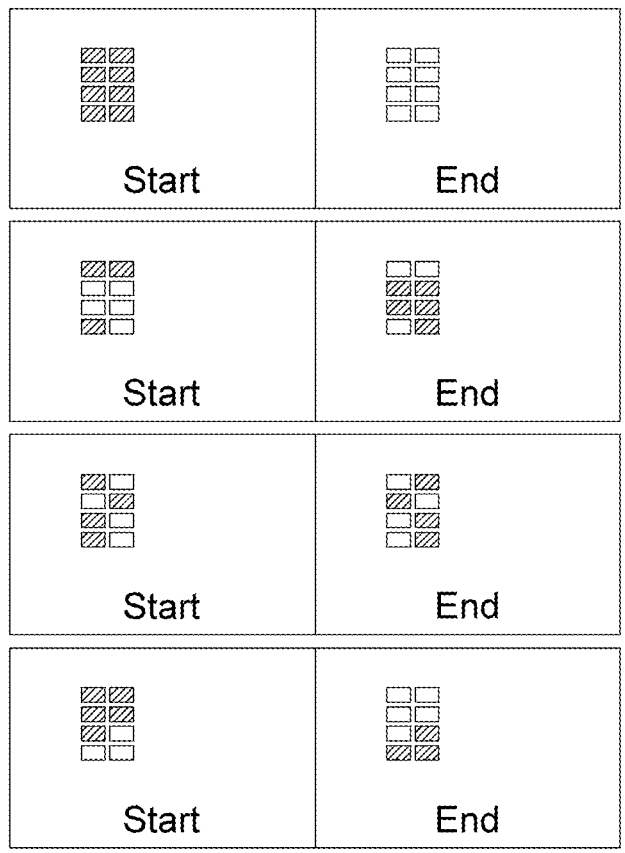
FIG. 10 shows a start pattern and an end pattern.

Temporal Filter for Spatial Domain Information Transmission:

Referring to FIG. 6, FIG. 7, FIG. 8, FIG. 9 and FIG. 10. FIG. 6 shows a light-emitting object location recognizing unit. FIG. 7 shows a timing diagram of the temporal filter for spatial domain information transmission. FIG. 8 shows an image differencing unit and a logic unit. FIG. 9 shows a flowchart of step 321. FIG. 10 shows a start pattern and an end pattern. To avoid being interfered with by background environment, the light-emitting object location recognizing unit 1242 recognizes the real light-emitting object location with a temporal filter. The light-emitting object location recognizing unit 1242 at least includes a temporal filter and a storage unit 12423, wherein the temporal filter includes an image differencing unit 12422, a logic unit 12425 and a location outputting unit 12426. The image differencing unit 12422 further includes subtractors 124222 and 124224. It is noted that the number of subtractors of the image differencing unit 12422 is not limited thereto, and can be flexibly adjusted according to the number of layers in the temporal filter.

The light-emitting object 1142 of FIG. 2 sequentially generates a start pattern S, an end pattern E, a start pattern S and an end pattern E at time $t-T_1-T_2-t_d$, time $t-T_1-t_d$, time $t-T_1$ and time t. There are an information transmission time T2 between time $t-T_1-T_2-t_d$ and time $t-T_1-t_d$ and an information transmission time T1 between time $t-T_1$ and time t. That is, the information transmission is alternately transmitted at two different times. Therefore, in practical application, more than two information transmission times can be determined. For the convenience of disclosure, only two different information transmission times are exemplified below.

The information transmission time T1 and the information transmission time T2 denote two different information transmission times. The image F(t), the image $F(t-T_1)$, the image $F(t-T_1-t_d)$ and the image $F(t-T_1-T_2-t_d)$ are respectively obtained by the image capturing unit 122 of FIG. 1 by sequentially capturing the end pattern E, the start pattern S, the end pattern E and the start pattern S at time t, time $t-T_1$, time $t-T_1-t_d$ and time $t-T_1-T_2-t_d$.

For the light-emitting object location to be easily recognized, the start pattern S and the end pattern E of the information are set to be complementary pattern. For the convenience of disclosure, FIG. 10 shows four examples of the complementary patterns. The start pattern S and the end pattern E can be selected from one of the complementary patterns illustrated in FIG. 10 or other complementary patterns not illustrated in FIG. 10.

Firstly, as indicated in step 3212, the image differencing unit 12422 performs image differencing to output a differential image K(t) and a differential image $K(t-T_1-t_d)$ according to the image F(t), the image $F(t-T_1)$, the image $F(t-T_1-t_d)$ and the image $F(t-T_1-T_2-t_d)$. The image F(t), the image $F(t-T_1)$, the image $F(t-T_1-t_d)$ and the image $F(t-T_1-T_2-t_d)$ are respectively obtained by capturing the light-emitting object 1142 of FIG. 2 by the image capturing unit 122 of FIG. 1 at time t, time $t-T_1$, time $t-T_1-t_d$ and time $t-T_1-T_2-t_d$. The image $F(t-T_1-T_2-t_d)$ and the image $F(t-T_1)$ are start patterns, and the image $F(t-T_1-t_d)$ and the image F(t) are end patterns.

The subtractor 124222 deducts the image $F(t-T_1-T_2-t_d)$ from the image $F(t-T_1-t_d)$ to output the differential image $K(t-T_1-t_d)$, and the subtractor 124224 deducts the image $F(t-T_1)$ from the image F(t) to output the differential image K(t). The image $F(t-T_1)$, the image $F(t-T_1-t_d)$ and the image $F(t-T_1-T_2-t_d)$ are stored in the storage unit 12423 when the light-emitting object location recognizing unit 1242 receives the image F(t).

Next, as indicated in step 3214, the logic unit 12425 performs a logic operation to output the foreground image FF according to the differential image K(t) and the differential image $K(t-T_1-t_d)$, wherein the logic operation is an intersection (AND) operation for example. Lastly, as indicated in step 3216, the location outputting unit 12426 recognizes the light-emitting object location of the light-emitting object 1142 of FIG. 2 in the image according to the foreground image FF.

Figure 11:
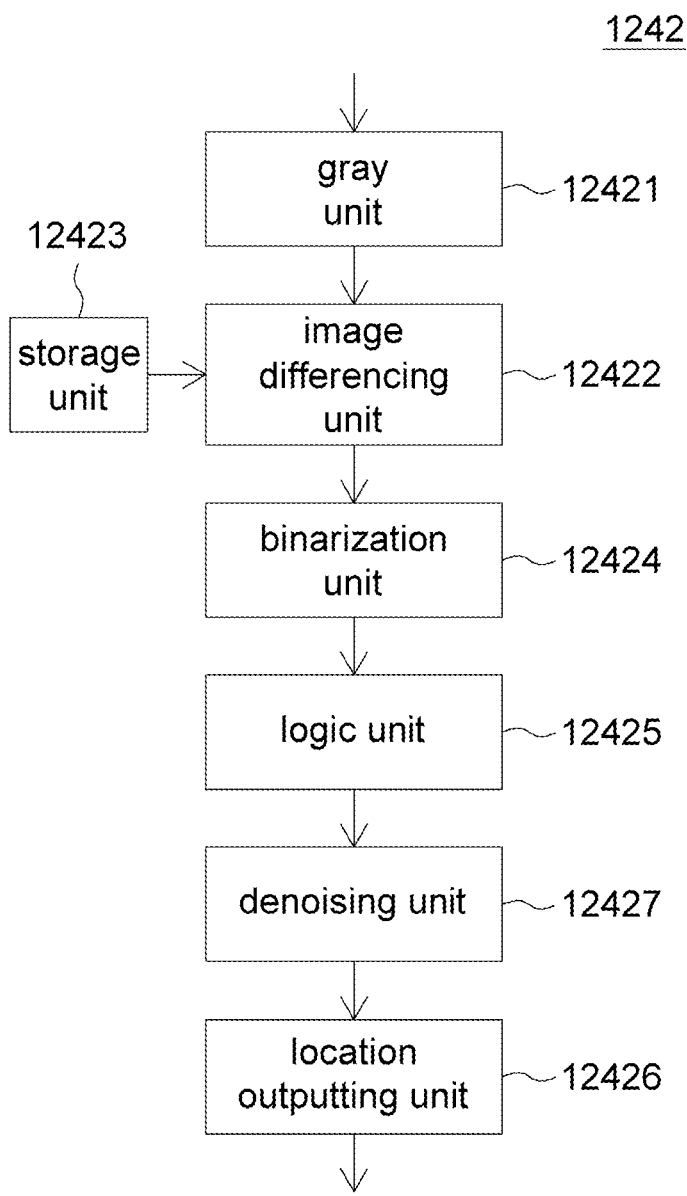
FIG. 11 shows another light-emitting object location recognizing unit.
Figure 12:
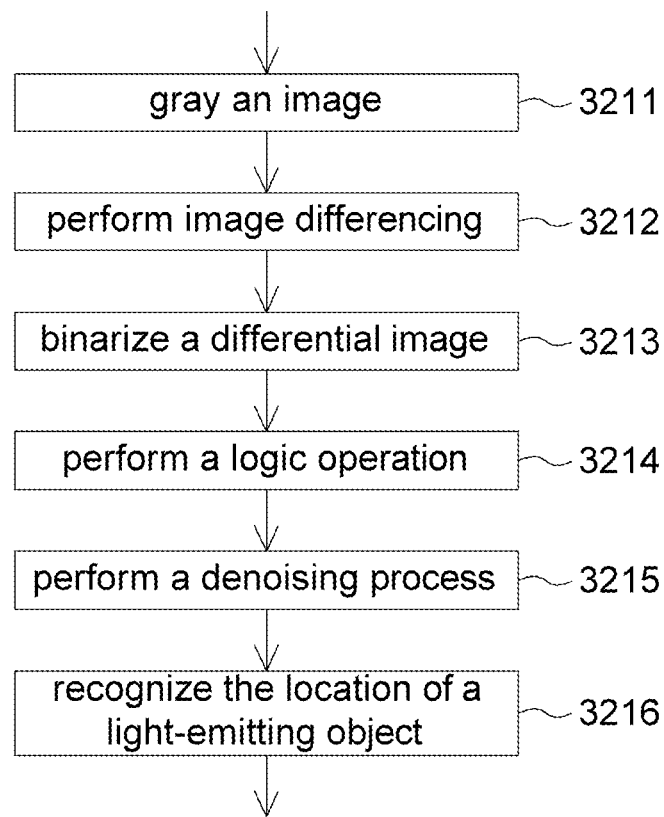
FIG. 12 shows another flowchart of step 321.
Figure 13:
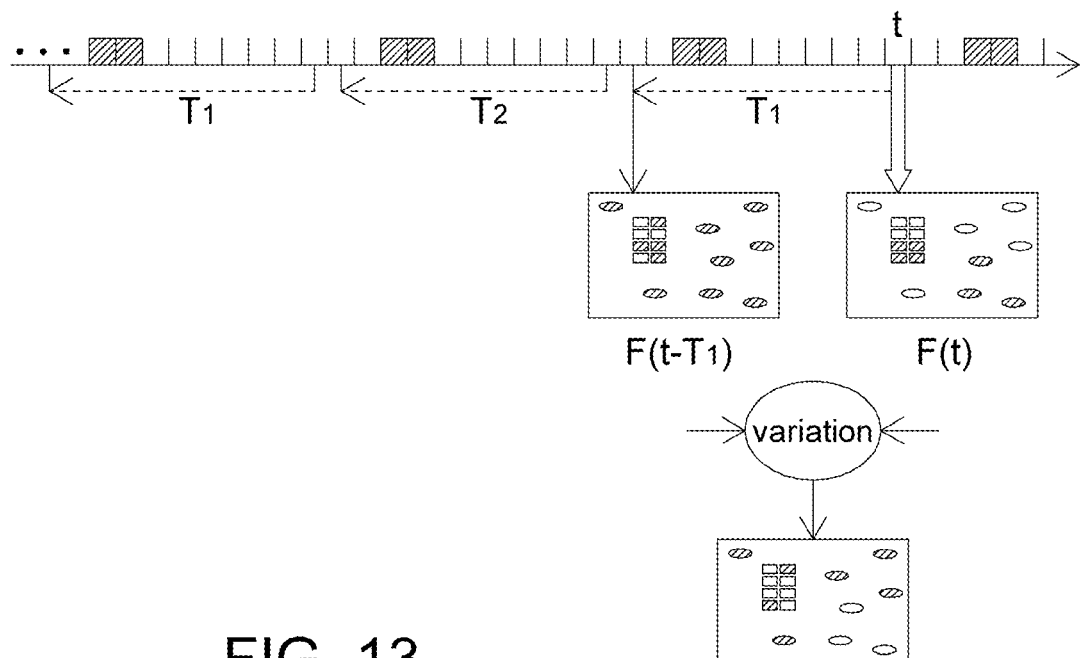
FIG. 13 to FIG. 16 respectively show three timing diagrams of the temporal filter of continuous time t~t+3.
Figure 14:
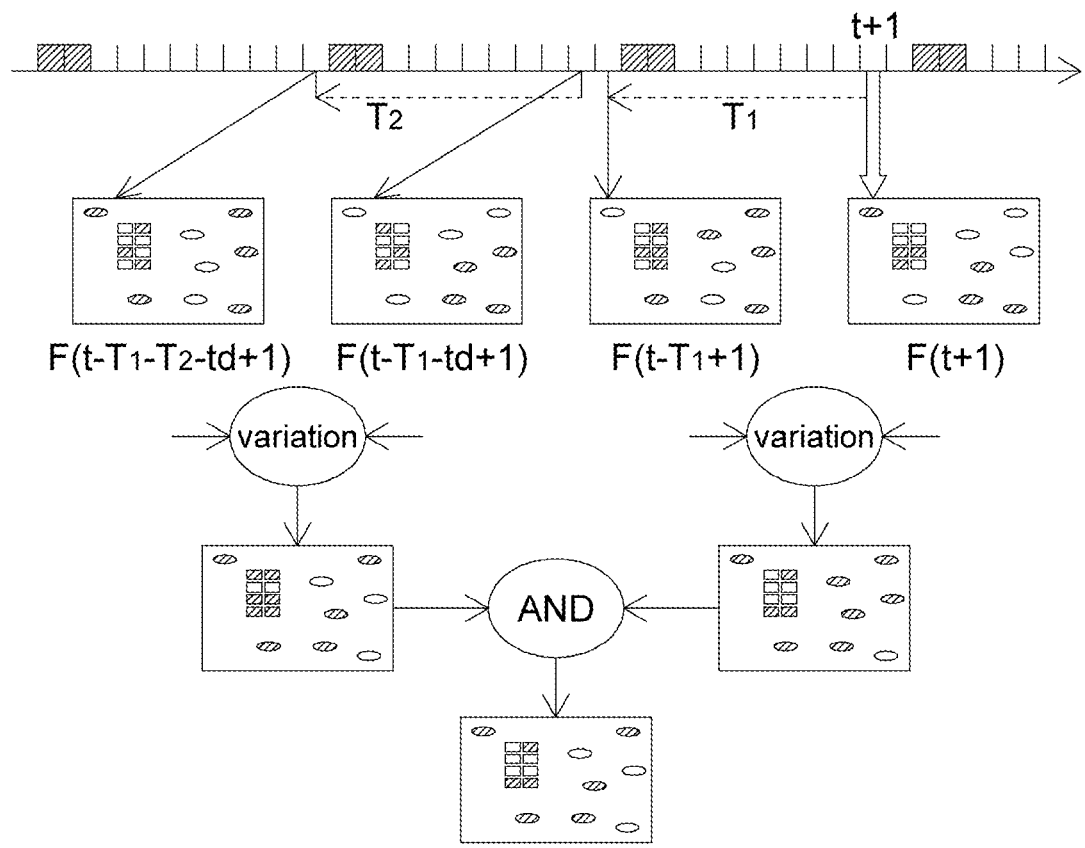
Figure 15:
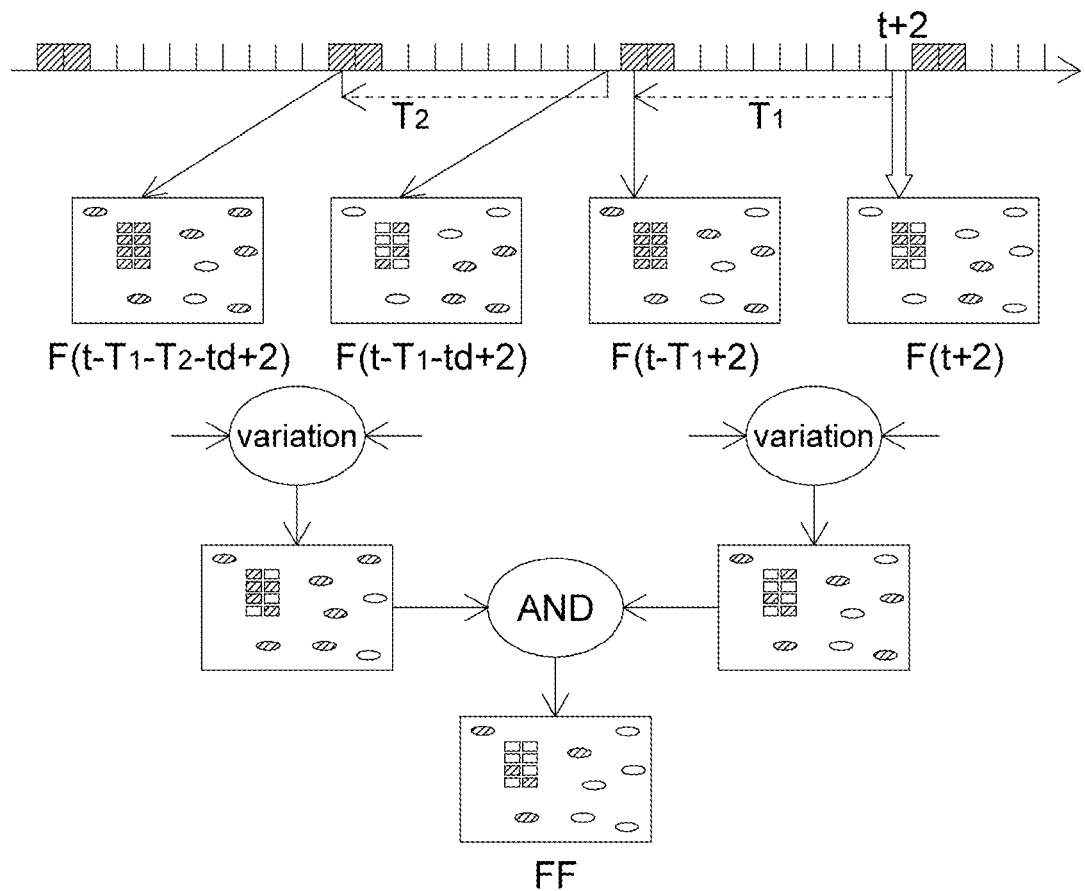
Figure 16:
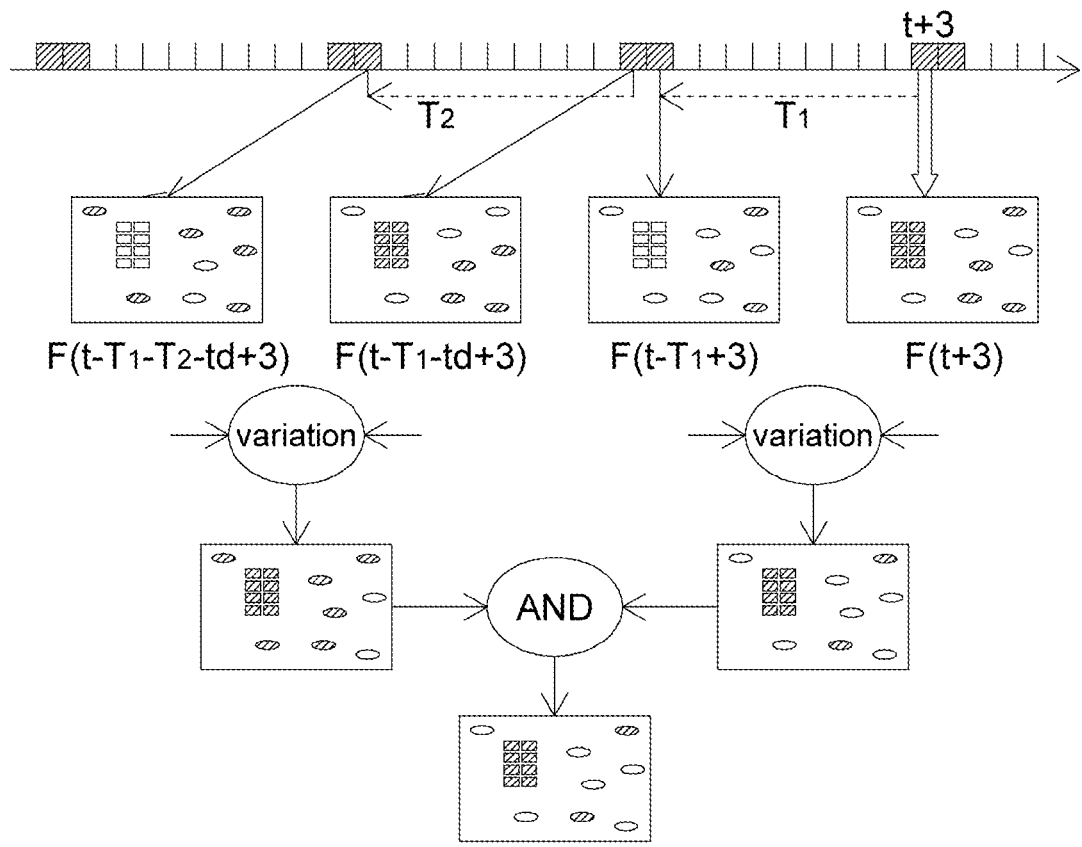

Referring to FIG. 7, FIG. 11 and FIG. 12. FIG. 11 shows another light-emitting object location recognizing unit. FIG. 12 shows another flowchart of step 321. The light-emitting object location recognizing unit 1242 further includes a gray unit 12421, a binarization unit 12424 and a denoising unit 12427. Step 321 further includes sub-steps 3211, 3213 and 3215. If the image outputted by the image capturing unit 122 of FIG. 1 is a gray image, then step 3211 can be omitted. To the contrary, if the image outputted by the image capturing unit 122 of FIG. 1 is a color image, then, as indicated in step 3211, the gray unit 12421 grays the image F(t), the image $F(t-T_1-T_2-t_d)$, the image $F(t-T_1-t_d)$ and the image $F(t-T_1)$ to output corresponding gray images. Then, the image differencing unit 12422 further performs image differencing to the gray images of the image F(t), the image $F(t-T_1-T_2-t_d)$, the image $F(t-T_1-t_d)$ and the image $F(t-T_1)$ to output the differential image K(t) and the differential image $K(t-T_1-t_d)$.

Afterwards, as indicated in step 3213, the binarization unit 12424 binarizes the differential image K(t) and the differential image $K(t-T1-t_d)$ to output the binarized images. Then, the logic unit 12425 performs a logic operation to the binarized images of the differential image K(t) and the differential image $K(t-T1-t_d)$ to output a logic operation result. After that, as indicated in step 3215, the denoising unit 12427 performs a denoising process such as expansion or erosion to the logic operation result to output the foreground image FF. Then, the location outputting unit 12426 further recognizes the light-emitting object location of the light-emitting object 1142 in the image F(t) according to the foreground image FF.

Referring to FIG. 13 to FIG. 16. FIG. 13 to FIG. 16 respectively show four timing diagrams of the temporal filter of continuous times t~t+3. Let FIG. 15 be taken for example, the number of foreground objects in the foreground image FF equals 4, and the number of light-emitting objects equals 8. If the number of foreground objects is smaller than that of light-emitting objects, this implies that the image F(t) is not the end pattern of the transmission information. Meanwhile, new images must be captured for the recognition of the light-emitting object location.

To the contrary, if the number of foreground objects is greater than that of light-emitting objects, then other images of previous layer is obtained for performing temporal filtering. For example, if the number of foreground objects of FIG. 16 equals 10, and the number of foreground objects of FIG. 14 equals 8, then other images can be obtained from the previous layer for performing temporal filtering process to recognize the real light-emitting object location. As only two layers within temporal filter are set in the embodiments of FIG. 14 and FIG. 16, the current recognition process of the temporal filter terminates here. Therefore, the present embodiment can recognize the location of the real light-emitting object by increasing the layer of the temporal filter.

Figure 17:
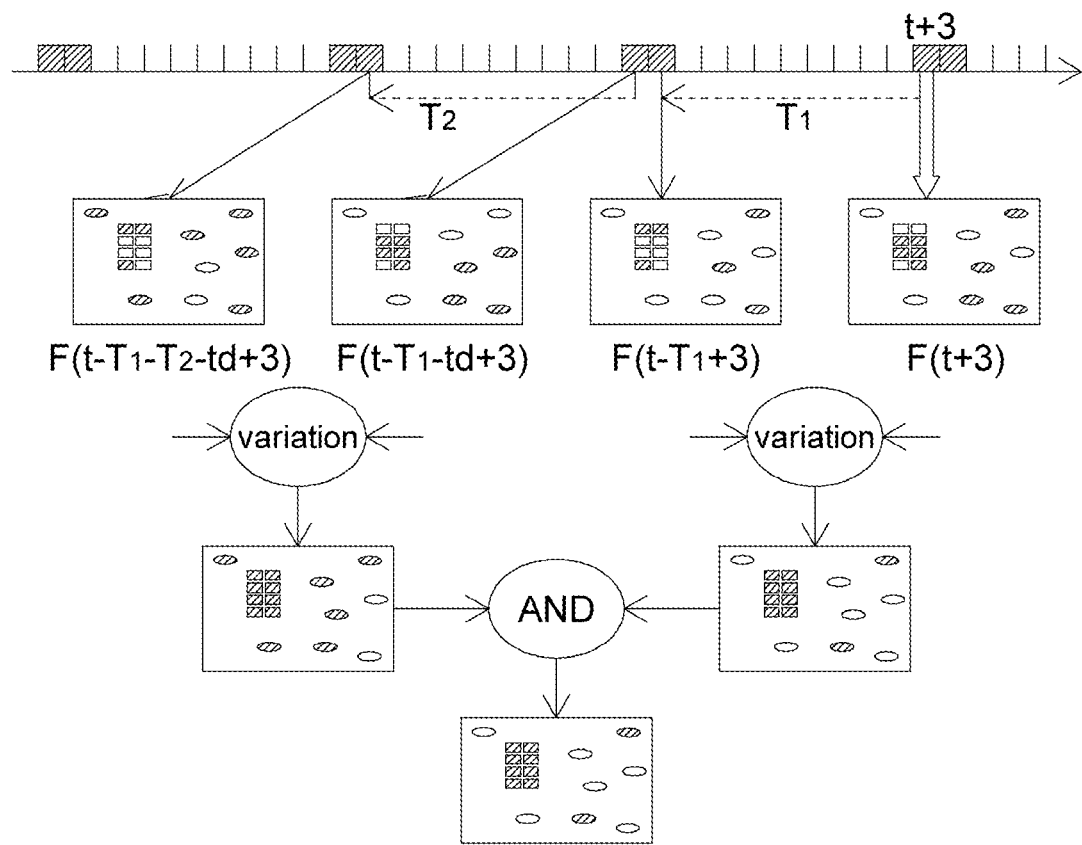
FIG. 17 and FIG. 18 show two timing diagrams of the temporal filter of other combinations of the start pattern and the end pattern.
Figure 18:
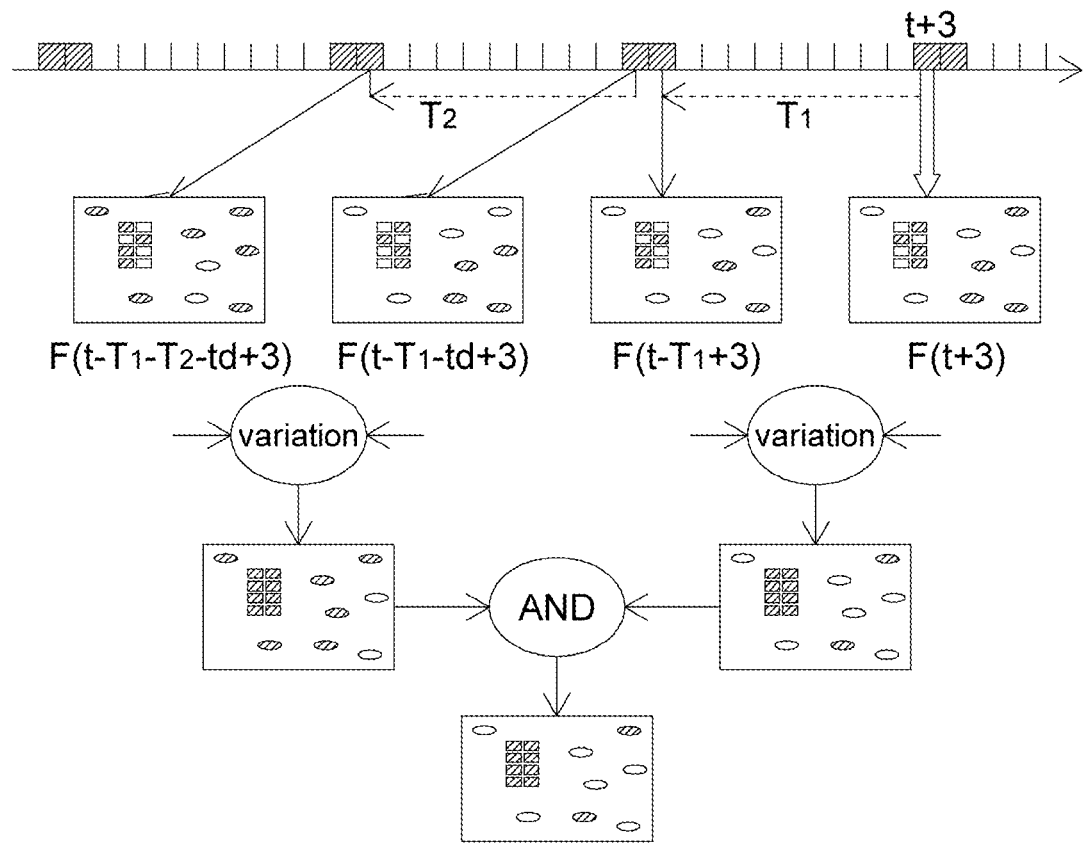

Referring to FIG. 17 and FIG. 18. FIG. 17 and FIG. 18 show two timing diagrams of the temporal filter of other combinations of the start pattern and the end pattern. Except for the foregoing illustration in FIG. 16, the temporal filter can perform temporal filtering with the combination of the start pattern and the end pattern to recognize the real light-emitting object location as indicated in FIG. 17 and FIG. 18.

Figure 19:
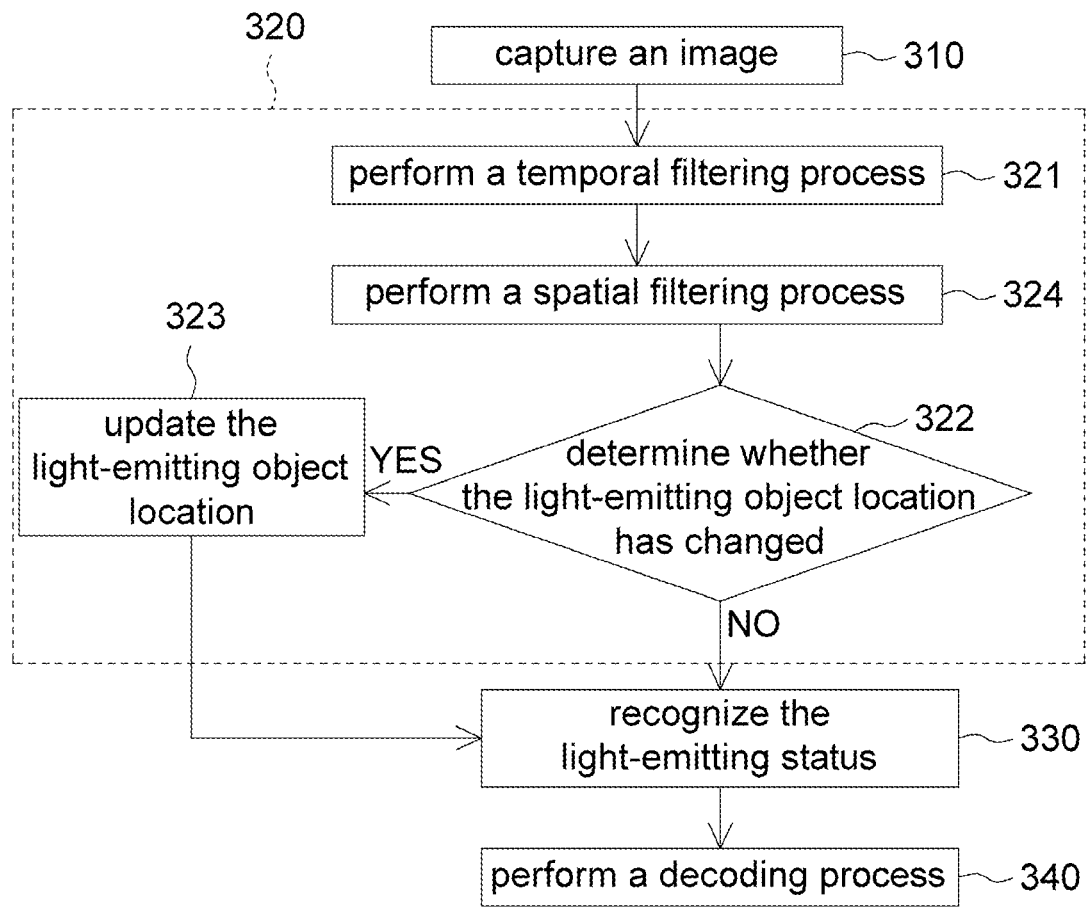
FIG. 19 shows another flowchart of the light-emitting object recognizing method.
Figure 20:
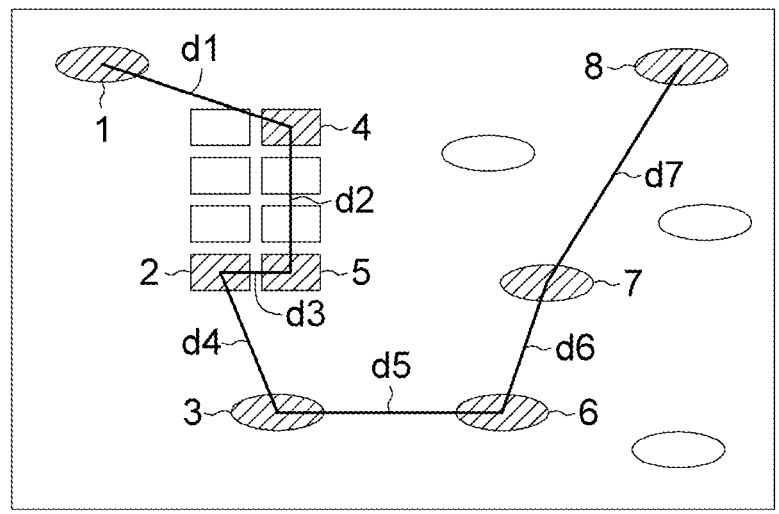
FIG. 20 shows a foreground image.

Spatial Filter for Spatial Domain Information Transmission:

Referring to FIG. 19 and FIG. 20. FIG. 19 shows another flowchart of the light-emitting object recognizing method. FIG. 20 shows a foreground image. In addition to performing temporal filtering with a temporal filter to recognize the real light-emitting object location, the light-emitting object location recognizing unit 1242 of FIG. 1 can further perform spatial filtering with a spatial filter to recognize the real light-emitting object location. That is, the light-emitting object recognizing method of FIG. 19 differs with the light-emitting object recognizing method of FIG. 3 in that the light-emitting object recognizing method of FIG. 19 further includes step 324. According to step 324, the light-emitting object location recognizing unit 1242 performs a spatial filtering process according to the result of temporal filtering with a spatial filter to recognize the real light-emitting object location. The spatial filter recognizes the light-emitting object location according to the geometric arrangement relation of the light-emitting object. The geometric arrangement relation is the shape, the arrangement pattern, the central point location, the mutual distance or the slope relation of the light-emitting object for example. Let FIG. 20 be taken for example, the lengths d1~d7 denote the shortest distance between each foreground object and its adjacent foreground object. For example, the foreground object 1 is closest to the foreground object 4, and the distance between the foreground object 1 and the foreground object 4 is the length d1. The angles s1~s7 respectively denote the angles of the lengths d1~d7.

Figure 21:
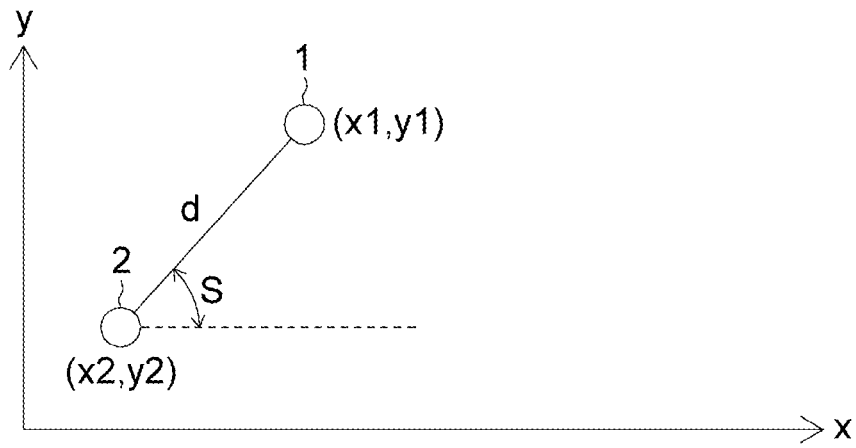
FIG. 21 shows the distance and the angle between two foreground objects.

Referring to FIG. 21, the distance and the angle between two foreground objects are shown. The coordinates of the two foreground objects are respectively (x1, y1) and (x2, y2). The lengths d1~d7 are obtained from the equation $d = \sqrt{(x1-x2)^2 + (y1-y2)^2}$, and the angles s1~s7 are obtained from the equation $$s = \cos^{-1}\left(\frac{(x1-x2)}{d}\right).$$

Figure 22:
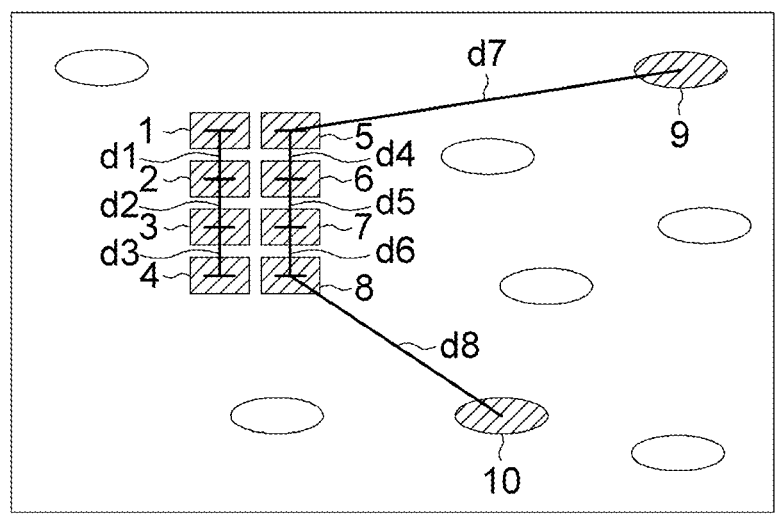
FIG. 22 shows a first embodiment of a spatial filter.

Referring to FIG. 22, a first embodiment of a spatial filter is shown. In FIG. 22, the lengths d1~d8 denote the shortest distance between each foreground object and its adjacent foreground objects. The angles s1~s8 respectively denote the angles between the lengths d1~d8 and the horizontal axis. For example, the length d1 denotes the distance between the foreground object 1 and the closest foreground object 2. As the lengths d1~d6 are almost the same and the angles s1~s6 are almost equal to 90 degrees, based on the statistical analysis of the lengths d1~d8 and the angles s1~s8, it is concluded that the foreground objects 1~8 belong to the same group, and the foreground object 9 and the foreground object 10 are other interfering objects. Also, whether the relation of the foreground objects 1~8 conforms to the geometric arrangement relation of the real light-emitting object is determined. In the present embodiment, the relation of the foreground objects 1~8 conforms to the geometric arrangement relation of the real light-emitting object.

Figure 23:
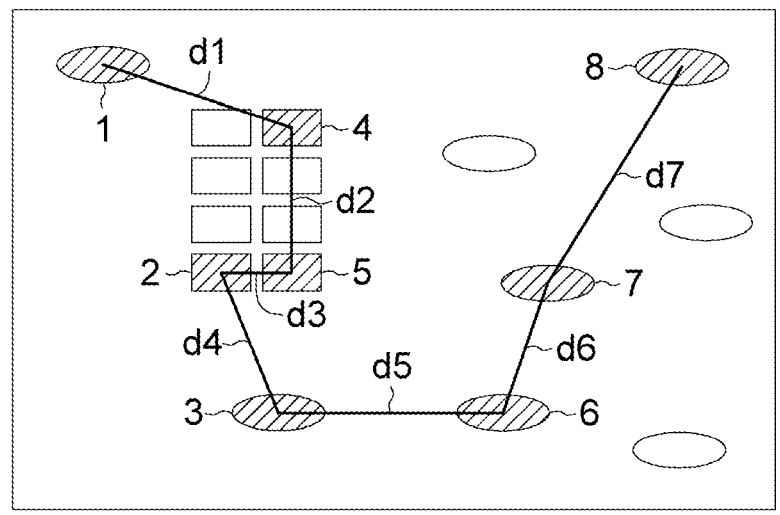
FIG. 23 shows a second embodiment of the spatial filter.

Referring to FIG. 23, a second embodiment of the spatial filter is shown. In FIG. 22, the lengths d1~d7 denote the shortest distance between each foreground object and its adjacent foreground object. The angles s1~s7 respectively denote the angles between the lengths d1~d7 and the horizontal axis. For example, the length d1 denotes the distance between the foreground object 1 and the closest foreground object 4. As the lengths d1~d6 are different and the angles s1~s6 are not exactly the same, based on the statistical analysis of the lengths d1~d7 and the angles s1~s7, it is concluded that the foreground objects 1~8 do not belong to the same group, and the relation of the foreground objects 1~8 does not conform to the geometric arrangement relation of the real light-emitting object.

Figure 24:
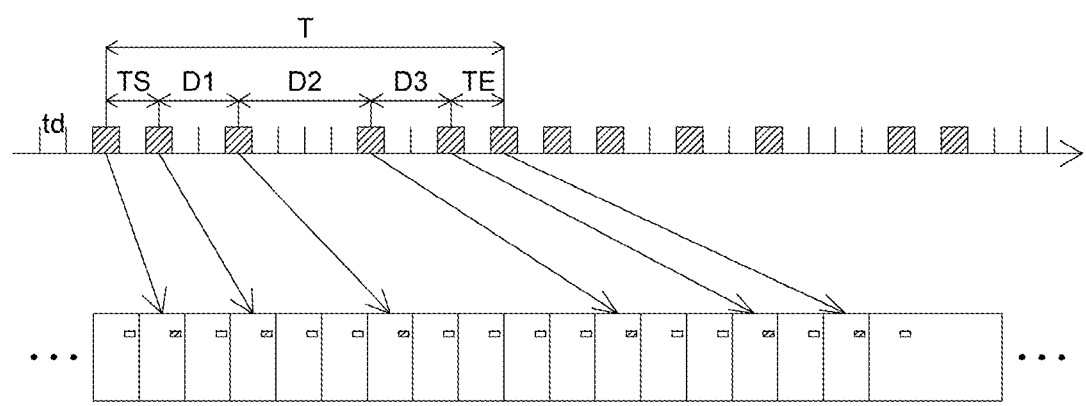
FIG. 24 shows time domain type information transmission.

Time Domain Information Transmission:

Referring to FIG. 24, time domain information transmission is shown. For the convenience of elaborating the light-emitting object recognizing method for time domain information transmission, the light-emitting object of the following embodiment is exemplified by a light emitting source. In FIG. 24, the light-emitting object transmits information through the time difference relation of the bright status and the dark status. The process of information transmission includes a start period TS and an end period TE to distinguish each item of transmitted information. The light-emitting object sequentially generates three bright-dark-bright patterns within the start period TS and sequentially generates the bright-dark-bright patterns within the end period TE. There are three time intervals D1, D2 and D3 between the start period TS and the end period TE. The time intervals D1, D2 and D3 denote the transmitted information, wherein T denotes the transmission time of each information, $t_d$ denotes the maintaining time of each pattern, and $fd=1/t_d$ equals pattern transmission frequency. Thus, the image capturing frequency fc of the image capturing unit 122 of FIG. 1 is at least greater than fd so as to capture information image.

When the light information transmission system operates under an ideal background environment, the location of the light-emitting object in the image can be obtained by simple foreground image capturing technology. Meanwhile, the reference image when the light-emitting object is dark can also be recognized. Then, the status of the light-emitting object is recognized with respect to each frame, and the time interval between this time when the light-emitting object turns to bright status from dark status and the next time when the light-emitting object turns to bright status from dark status again is calculated.

The start period TS, the time intervals D1, D2 and D3 and the end period TE can be measured through the image capturing time of the image capturing unit 122 of FIG. 1. Lastly, the transmitted information can be obtained according to the time intervals D1, D2 and D3 and the decoding step. Likewise, if there are more than two light-emitting objects, then more than two groups of time intervals D1, D2 and D3 will be employed to denote the transmitted information.

Figure 25:
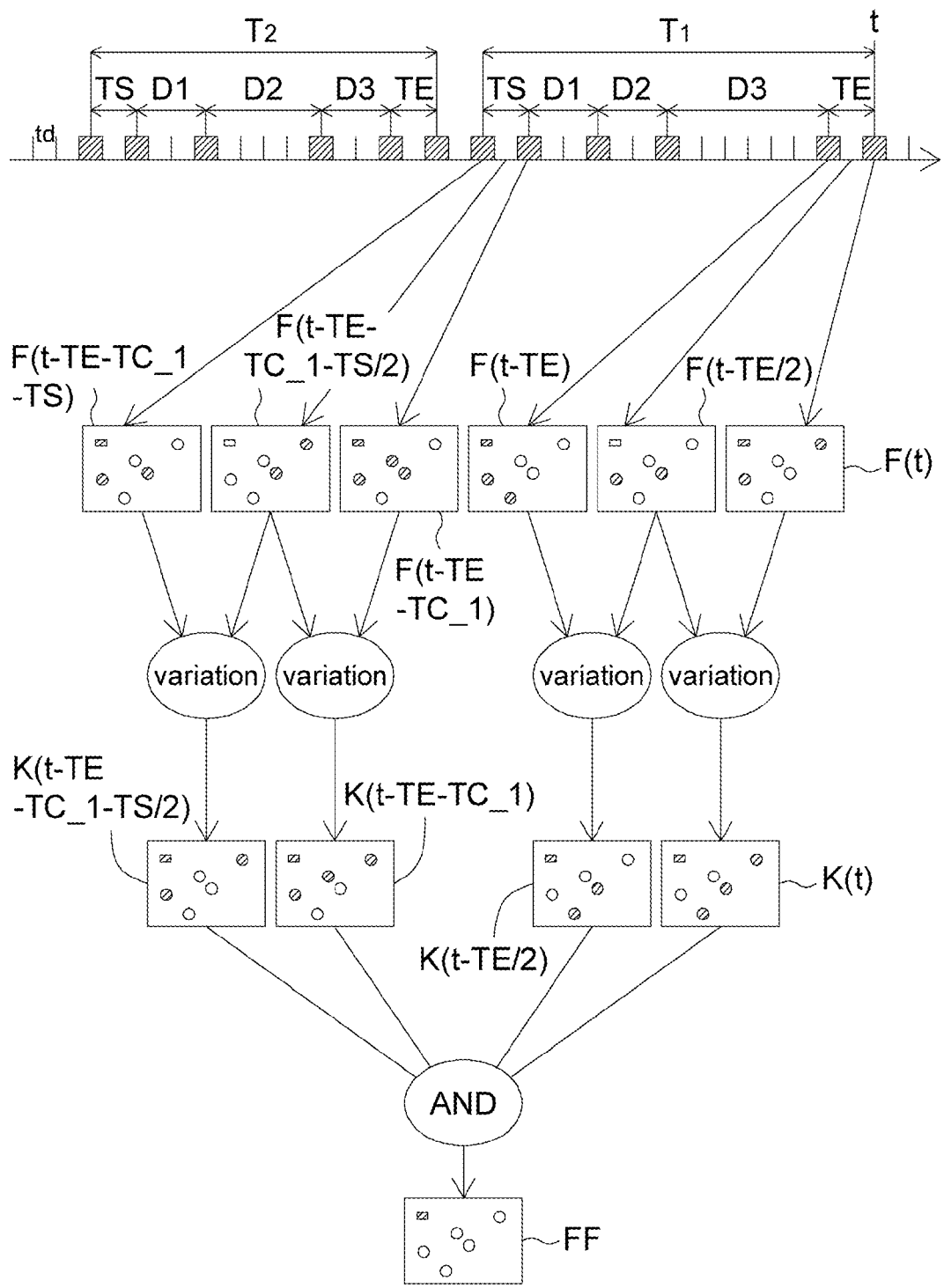
FIG. 25 shows a temporal filter for time domain information transmission.
Figure 26:
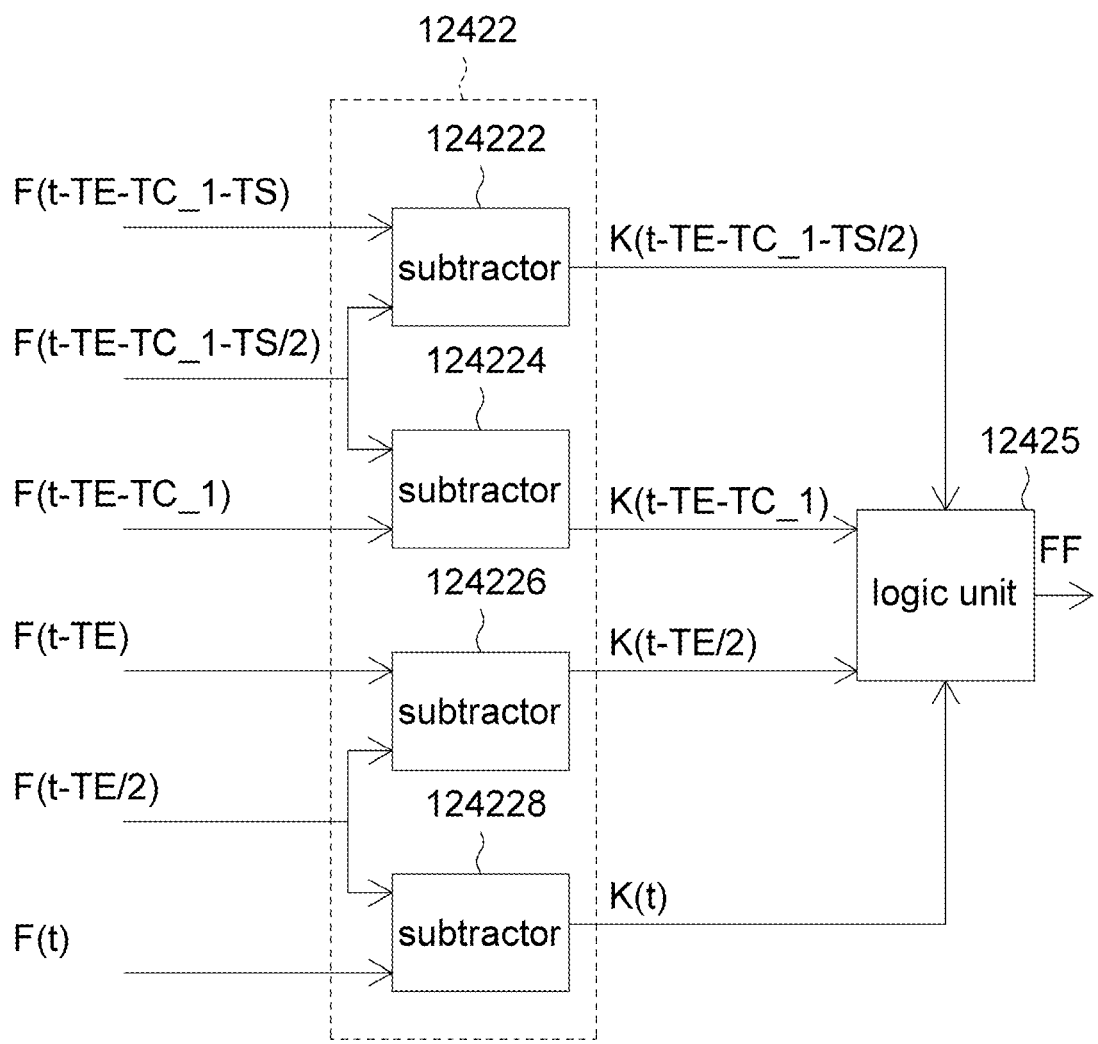
FIG. 26 shows another image differencing unit and another logic unit.

Temporal Filter for Time Domain Information Transmission:

Referring to FIG. 25 and FIG. 26. FIG. 25 shows a temporal filter for time domain information transmission. FIG. 26 shows another image differencing unit and another logic unit. Normally, information transmission is interfered with by background environment. According to the principles of temporal filter, the start period TS and the end period TE are known. Likewise, the recognition of the light-emitting object location can be performed according to image processing such as image differencing, binarization, denoising operation and intersection operation.

The information transmission time $T_1$ and the information transmission time $T_2$ denote two different information transmission times. That is, the information transmission is alternately transmitted at two different times. More than two different times of information transmission can be set in practical application. For the convenience of disclosure, only two different information transmission times are exemplified below. The time $t_d$ denotes the maintaining time of each pattern. In the present embodiment, TC_1 equals $T_1$−TS−TE, and TC_2 equals $T_2$−TS−TE.

The light-emitting object sequentially generates bright-dark-bright patterns within a start period TS, and the image capturing unit 122 of FIG. 1 respectively captures three bright status-dark-bright patterns at time t−TE−TC_1, time $$t - TE - TC\_1 - \frac{TS}{2}$$

and time t−TE−TC_1−TS to output the image F(t−TE−TC_1), the image $$F\left(t - TE - TC\_1 - \frac{TS}{2}\right)$$

and the image F(t−TE−TC_1−TS). The light-emitting object sequentially generates three in bright-dark-bright patterns within the end period TE, and the image capturing unit 122 of FIG. 1 respectively captures three bright-dark-bright patterns at time t−TE, time $$t - \frac{TE}{2}$$

and time t to output the image F(t−TE), the image $$F\left(t - \frac{TE}{2}\right)$$

and the image F(t).

The image differencing unit 12422 further includes subtractors 124222, 124224, 124226 and 124228. The number of subtractors of the image differencing unit 12422 is not limited to four, and can be flexibly adjusted according to the number of layers in the temporal filter. The subtractor 124222 deducts the image F(t−TE−TC_1−TS) from the image $$F\left(t - TE - TC\_1 - \frac{TS}{2}\right)$$

to output the differential image $$K\left(t - TE - TC\_1 - \frac{TS}{2}\right).$$

The subtractor 124224 deducts the image $$F\left(t - TE - TC\_1 - \frac{TS}{2}\right)$$

from the image F(t−TE−TC_1) to output the differential image K(t−TE−TC_1). The subtractor 124226 deducts the image F(t−TE) from the image $$F\left(t - \frac{TE}{2}\right)$$

to output the differential image $$K\left(t - \frac{TE}{2}\right).$$

The subtractor 124228 deducts the image $$F\left(t - \frac{TE}{2}\right)$$

from the image F(t) to output the differential image K(t). The logic unit 12425 performs intersection operation to the differential image $$K\left(t - TE - TC\_1 - \frac{TS}{2}\right),$$

the differential image K(t−TE−TC_1), the differential image $$K\left(t - \frac{TE}{2}\right)$$

and the differential image K(t) to output the foreground image FF.

In other words, as the image F(t) and the image $$F\left(t - \frac{TE}{2}\right)$$

respectively are the images of the light-emitting object in bright status and dark status, the image F(t) and the image $$F\left(t - \frac{TE}{2}\right)$$

for capturing the foreground image such as the differential image K(t) are obtained through image differencing. Likewise, the differential image $$K\left(t - \frac{TE}{2}\right),$$

the differential image K(t−TE−TC_1) and the differential image $$K\left(t - TE - TC\_1 - \frac{TS}{2}\right)$$

can be obtained according to the image $$F\left(t - \frac{TE}{2}\right),$$

the image F(t−TE), the image F(t−TE−TC_1), the image $$F\left(t - TE - TC\_1 - \frac{TS}{2}\right)$$

and the image F(t−TE−TC_1−TS). Then, the location of the foreground object can be obtained through intersection operation.

If the number of foreground objects is smaller than that of light-emitting objects, this implies that the image F(t) is not the end image of transmission information, and new image must be captured for the recognition of the light-emitting object location. If the number of foreground objects is greater than or equal to the number of light-emitting objects, then the number of layers in the temporal filter can be further increased for the recognition of the light-emitting object location. Besides, extra spatial filter can be added to assist the recognition of the light-emitting object location.

The light information receiving method, the light-emitting object location recognizing method and the light-emitting object recognizing unit disclosed in the above embodiments of the disclosure have many advantages exemplified below:

Firstly, the interference from environmental background is avoided

Secondly, no complicated image processing is required.

Thirdly, the light-emitting object status can be correctly recognized.

While the disclosure has been described by way of example and in terms of a preferred embodiment, it is to be understood that the disclosure is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A light information receiving method, comprising:
    capturing a light-emitting object array to obtain a plurality of images, wherein the light-emitting object array comprises at least one light-emitting object;
    performing a temporal filtering process to the images to recognize a light-emitting object location;
    recognizing a light-emitting status of the light-emitting object array according to the light-emitting object location; and
        performing a decoding process to output an item of information according to the light-emitting status.

2. The light information receiving method according to claim 1, wherein the step of temporal filtering comprises:
    performing image differencing to output a plurality of differential images according to the images;
    performing a logic operation to output a foreground image according to the differential images; and
    recognizing the light-emitting object array in the light-emitting object location according to the foreground image.

3. The light information receiving method according to claim 2, wherein the images are further grayed to output a plurality of gray images, and image differencing is performed to the gray images to output the differential image.

4. The light information receiving method according to claim 2, wherein the differential images are further binarized to output a plurality of binarized images, and logic operation is performed to the binarized images to output the foreground image.

5. The light information receiving method according to claim 2, wherein a denoising process is further performed to a logic operation result of the differential images to output the foreground image.

6. The light information receiving method according to claim 2, wherein the logic operation is an intersection (AND) operation.

7. The light information receiving method according to claim 2, wherein the images comprise a first image, a second image, a third image and a fourth image, the differential images comprise a first differential image and a second differential image, and in the step of image differencing, the second image is deducted from the first image to output the first differential image, and the fourth image is deducted from the third image to output the second differential image.

8. The light information receiving method according to claim 7, wherein the step of logic operation, an intersection operation is performed to the first differential image and the second differential image to output the foreground image.

9. The light information receiving method according to claim 7, wherein the light-emitting object array sequentially generates a first start pattern, a first end pattern, a second start pattern and a second end pattern at a first time, a second time, a third time and a fourth time, there are a first information transmission time between the first time and the second time and a second information transmission time between the third time and the fourth time, and the first image, the second image, the third image and the fourth image are respectively obtained by capturing the first start pattern, the first end pattern, the second start pattern and the second end pattern.

10. The light information receiving method according to claim 7, wherein the first image and the second image are complementary to each other, and so are the third image and the fourth image complementary to each other.

11. The light information receiving method according to claim 2, wherein the images comprise a first image, a second image, a third image, a fourth image, a fifth image and a sixth image, the differential images comprise a first differential image, a second differential image, a third differential image and a fourth differential image, and in the step of image differencing, the second image is deducted from the first image to output the first differential image, the third image is deducted from the second image to output the second differential image, the fifth image is deducted from the fourth image to output the third differential image, and the sixth image is deducted from the fifth image to output the fourth differential image.

12. The light information receiving method according to claim 11, wherein in the step of logic operation, an intersection operation is performed to the first differential image, the second differential image, the third differential image and the fourth differential image to output the foreground image.

13. The light information receiving method according to claim 11, wherein the light-emitting object array sequentially generates a first pattern, a second pattern and a third pattern within a start period and sequentially generates a fourth pattern, a fifth pattern and a sixth pattern within an end period, there is at least one time interval between the start period and the end period, the time interval denotes the transmitted information, and the first image, the second image, the third image, the fourth image, the fifth image and the sixth image are respectively obtained by capturing the first pattern, the second pattern, the third pattern, the fourth pattern, the fifth pattern and the sixth pattern.

14. The light information receiving method according to claim 1, wherein in the step of temporal filtering, the temporal filtering and a spatial filtering are performed to the images to recognize the light-emitting object location.

15. The light information receiving method according to claim 14, wherein the spatial filtering recognizes the light-emitting object location according to a geometric arrangement relation of the light-emitting object array.

16. The light information receiving method according to claim 15, wherein the geometric arrangement relation is the shape, the arrangement pattern, the central point location, the mutual distance or the slope relation of the light-emitting object in the light-emitting object array.

17. The light information receiving method according to claim 1, wherein the step of recognizing the light-emitting object location comprises:
   determining whether the light-emitting object location has changed; and
   updating the light-emitting object location if the light-emitting object location has changed.

18. The light information receiving method according to claim 2, wherein the step of temporal filtering process is performed with a temporal filter, which comprises a plurality of subtractors for performing image differencing, and the number of subtractors is adjusted according to the number of layers in the temporal filter.

19. The light information receiving method according to claim 1, wherein the light-emitting object array emits the light according to at least one information transmission time.

20. The light information receiving method according to claim 19, wherein the light-emitting object array emits the light according to a plurality of information transmission times.

* * * * *